US008903967B2

(12) United States Patent
Murphy et al.

(10) Patent No.: US 8,903,967 B2
(45) Date of Patent: *Dec. 2, 2014

(54) OUT-OF-BAND MANAGEMENT OF THIRD PARTY ADAPTER CONFIGURATION SETTINGS IN A COMPUTING SYSTEM

(75) Inventors: Randall L. Murphy, Cary, NC (US); Nathan C. Skalsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/534,153

(22) Filed: Jun. 27, 2012

(65) Prior Publication Data

US 2013/0091260 A1 Apr. 11, 2013

Related U.S. Application Data

(63) Continuation of application No. 13/270,314, filed on Oct. 11, 2011.

(51) Int. Cl.
| | |
|---|---|
| *G06F 3/00* | (2006.01) |
| *G06F 3/12* | (2006.01) |
| *G06F 9/445* | (2006.01) |
| *G06F 9/44* | (2006.01) |

(52) U.S. Cl.
CPC .............. *G06F 8/665* (2013.01); *G06F 3/1225* (2013.01); *G06F 9/4411* (2013.01)
USPC ............................. 709/221; 710/11; 717/173

(58) Field of Classification Search
CPC ..... G06F 3/123; G06F 3/1225; G06F 9/4411; G06F 8/665
USPC ....................... 717/173, 170; 710/11; 709/221
See application file for complete search history.

(56) References Cited

U.S. PATENT DOCUMENTS

| | | | | |
|---|---|---|---|---|
| 7,127,579 | B2 | 10/2006 | Zimmer et al. | |
| 7,246,224 | B2 | 7/2007 | Rothman et al. | |
| 7,539,854 | B2 | 5/2009 | Rothman et al. | |
| 7,698,639 | B2 | 4/2010 | Kamdar et al. | |
| 7,921,420 | B2 * | 4/2011 | Ferlitsch | 717/170 |
| 8,095,924 | B2 * | 1/2012 | Choi et al. | 717/173 |
| 8,402,477 | B2 * | 3/2013 | Machida | 719/321 |
| 2008/0127165 | A1 * | 5/2008 | Mullis et al. | 717/173 |
| 2008/0177904 | A1 * | 7/2008 | Storey et al. | 710/10 |
| 2010/0094979 | A1 * | 4/2010 | Azami | 709/221 |

(Continued)

*Primary Examiner* — Ernest Unelus
(74) *Attorney, Agent, or Firm* — Edward J. Lenart; Katherine S. Brown; Biggers Kennedy Lenart Spraggins LLP

(57) ABSTRACT

Out-of-band management of third party adapter configuration settings in a computing system, the computing system including one or more configurable adapters, including: retrieving, by an out-of-band configuration manager from an out-of-band configuration repository, out-of-band configuration settings for a configurable adapter; determining, by the out-of-band configuration manager, whether the out-of-band configuration settings for the configurable adapter have been updated; and responsive to determining that the out-of-band configuration settings for the configurable adapter have been updated: updating, by the out-of-band configuration manager, in-band configuration settings for the configurable adapter, wherein the in-band configuration settings for the configurable adapter are stored in an in-band configuration repository; retrieving, by the out-of-band configuration manager from the in-band configuration repository, metadata that includes updated in-band configuration settings for the configurable adapter; and sending, by the out-of-band configuration manager to a configuration implementer, the metadata that includes updated in-band configuration settings for the configurable adapter.

3 Claims, 3 Drawing Sheets

(56) References Cited

U.S. PATENT DOCUMENTS

| | | |
|---|---|---|
| 2010/0169633 A1 | 7/2010 | Zimmer et al. |
| 2011/0252414 A1* | 10/2011 | Chiu et al. ................ 717/173 |
| 2012/0173764 A1* | 7/2012 | Zawacki et al. ............ 710/8 |
| 2012/0180076 A1* | 7/2012 | Shutt et al. ................ 719/327 |
| 2012/0303771 A1* | 11/2012 | Bharadwaj Subramanya ............ 709/221 |

* cited by examiner

OUT-OF-BAND MANAGEMENT OF THIRD PARTY ADAPTER CONFIGURATION SETTINGS IN A COMPUTING SYSTEM

CROSS-REFERENCE TO RELATED APPLICATION

This application is a continuation application of and claims priority from U.S. patent application Ser. No. 13/270,314, filed on Oct. 11, 2011.

BACKGROUND OF THE INVENTION

1. Field of the Invention

The field of the invention is data processing, or, more specifically, methods, apparatus, and products for out-of-band management of third party adapter configuration settings in a computing system.

2. Description of Related Art

Current computer systems do not allow for off-line, out-of-band management of third-party option firmware settings for computing devices within a computing system. Instead, third-party option firmware settings for computing devices within a computing system must be managed by manipulating configuration data that is used to initialize and configure the computing devices within a computing system. Manipulating configuration data that is used to initialize and configure the computing devices within a computing system can often be an inefficient and laborious process.

SUMMARY OF THE INVENTION

Methods, apparatus, and products for out-of-band management of third party adapter configuration settings in a computing system, the computing system including one or more configurable adapters, including: retrieving, by an out-of-band configuration manager from an out-of-band configuration repository, out-of-band configuration settings for a configurable adapter; determining, by the out-of-band configuration manager, whether the out-of-band configuration settings for the configurable adapter have been updated; and responsive to determining that the out-of-band configuration settings for the configurable adapter have been updated: updating, by the out-of-band configuration manager, in-band configuration settings for the configurable adapter, wherein the in-band configuration settings for the configurable adapter are stored in an in-band configuration repository; retrieving, by the out-of-band configuration manager from the in-band configuration repository, metadata that includes updated in-band configuration settings for the configurable adapter; and sending, by the out-of-band configuration manager to a configuration implementer, the metadata that includes updated in-band configuration settings for the configurable adapter.

In such a way, embodiments of the present invention enable out-of-band management of configuration settings for configurable adapters without modifying the any of the processes that are currently used to configure adapters in a computing system. As such, augmenting exciting computing systems to support out-of-band management of configuration settings for configurable adapters can be implemented with minimal costs, as existing configuration processes need not be modified.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
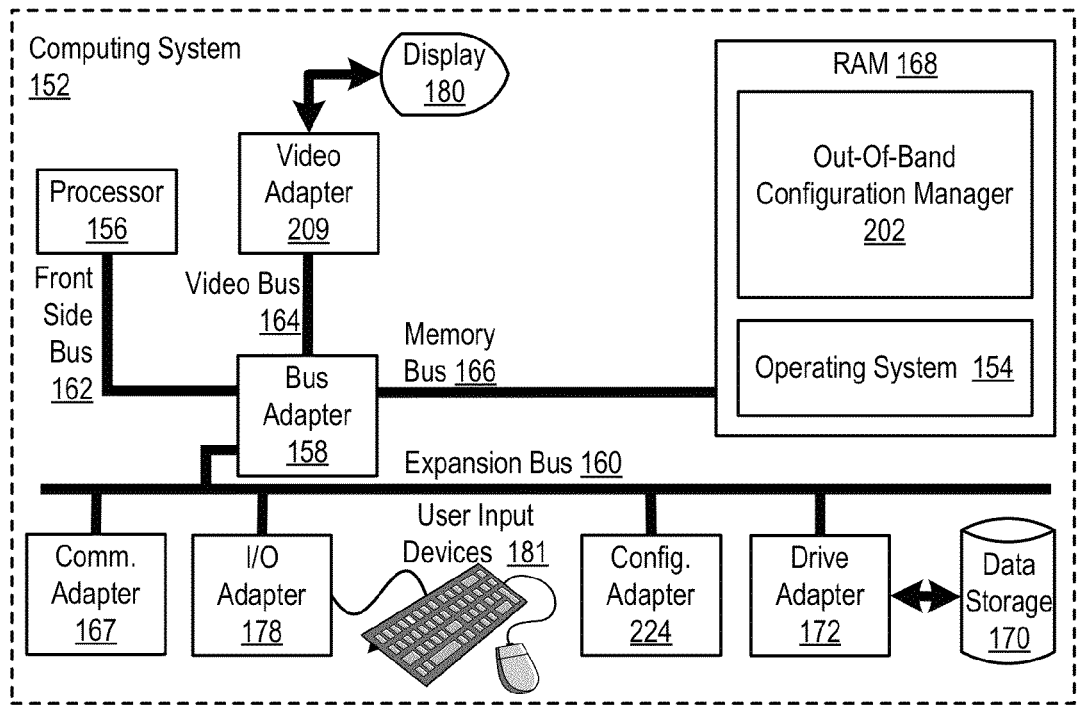
FIG. 1 sets forth a block diagram of automated computing machinery comprising an example computing system useful in out-of-band management of third party adapter configuration settings in a computing system according to embodiments of the present invention.

Exemplary methods, apparatus, and products for out-of-band management of third party adapter configuration settings in a computing system (152) in accordance with the present invention are described with reference to the accompanying drawings, beginning with FIG. 1. FIG. 1 sets forth a block diagram of automated computing machinery comprising an example computing system (152) useful in out-of-band management of third party adapter configuration settings in a computing system according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

The computing system (152) of FIG. 1 includes one or more configurable adapters (224). A configurable adapter (224) is any adapter that enables the computing system (152) to interact with other computing systems over a predetermined communications protocol. Such configurable adapters (224) may operate as, for example, a FiberChannel adapter, Ethernet adapter, Redundant Array of Independent Disks ('RAID') controller, and so on. In the example of FIG. 1, the configurable adapter (224) is configurable in the sense that operating aspects of the adapter, such as the data communications protocol implemented by the adapter, the adapter port that is utilized for data communications using a particular data communications protocol, and so on, can be altered based on the configuration settings that are loaded into the adapter.

Stored in RAM (168) is an out-of-band configuration manager (202), a module of computer program instructions for out-of-band management of third party adapter configuration settings in a computing system (152) according to embodiments of the present invention. The out-of-band configuration manager (202) may be embodied as a module of computer program instructions for out-of-band management of configuration parameters for the configurable adapter (224). The out-of-band configuration manager (202) is out-of-band in the sense that, in the normal process of booting the computing system (152) and configuring the configurable adapter (224), the out-of-band configuration manager (202) takes no active role in actually configuring the configurable adapter (224). Computer program instructions such as system BIOS and the like are instead responsible for actively configuring the configurable adapter (224). As such, while the out-of-band configuration manager (202) can alter configuration settings that are subsequently retrieved and applied by boot software such as system BIOS, the out-of-band configuration manager (202) itself includes no computer program instructions that perform the action of initializing and configuring a configurable adapter (224).

The out-of-band configuration manager (202) can perform out-of-band management of third party adapter configuration settings in the computing system (152) by retrieving, from an out-of-band configuration repository, out-of-band configuration settings for the configurable adapter (224). The out-of-band configuration repository may be embodied as computer memory that includes configuration parameters for the configurable adapter (224) and is accessible by the out-of-band configuration manager (202). The out-of-band configuration repository is out-of-band in the sense that, in the normal process of booting the computing system and configuring the configurable adapter (224), boot software such as system BIOS does not access the out-of-band configuration repository to retrieve configuration parameters that are used when configuring and initializing a configurable adapter (224). The out-of-band configuration repository may be embodied, for example, as a database or other data source managed by a system management controller such as, for example, an integrated management module ('IMM'), baseboard management controller ('BMC'), and so on.

The out-of-band configuration manager (202) can retrieve out-of-band configuration settings for the configurable adapter, for example, by searching the out-of-band configuration repository for an entry that corresponds to an identifier for the configurable adapter (224). The out-of-band configuration settings are settings that specify how the configurable adapter (224) is to operate. Example of such settings include settings that specify which data communications protocol the configurable adapter (224) should utilize for data communications with other computing systems, settings that specify which port data communications with other computing systems should be conducted over, and so on. The out-of-band configuration settings are out-of-band in the sense that, in the normal process of booting the computing system and configuring the configurable adapter (224), boot software such as system BIOS does not retrieve the out-of-band configuration settings, and the out-of-band configuration settings are not used directly by the boot software when configuring and initializing a configurable adapter (224).

The out-of-band configuration manager (202) can further perform out-of-band management of third party adapter configuration settings in the computing system (152) by determining whether the out-of-band configuration settings for the configurable adapter (224) have been updated. Determining whether the out-of-band configuration settings for the configurable adapter (224) have been updated may be carried out by checking an update flag contained in the out-of-band configuration settings. Such an update flag may include a value that is used to indicate whether the out-of-band configuration settings have been updated since the out-of-band configuration manager (202) last accessed the out-of-band configuration settings. Alternatively, determining whether the out-of-band configuration settings for the configurable adapter (224) have been updated may be carried out by comparing the out-of-band configuration settings for the configurable adapter (224) to a previous version of the out-of-band configuration settings for the configurable adapter (224). Comparing the out-of-band configuration settings for the configurable adapter (224) to a previous version of the out-of-band configuration settings for the configurable adapter (224) can be carried out, for example, on a value-by-value basis or by computing a hash value for each version of settings and comparing the resultant hash values.

The out-of-band configuration manager (202) can further perform out-of-band management of third party adapter configuration settings in the computing system (152) by updating in-band configuration settings for the configurable adapter (224) in response to determining that the out-of-band configuration settings for the configurable adapter (224) have been updated. The in-band configuration settings are settings that specify how the configurable adapter (224) is to operate such. Examples of such settings include settings that specify which data communications protocol the configurable adapter (224) should utilize for data communications with other computing systems, settings that specify which port data communications with other computing systems should be conducted over, and so on. The in-band configuration settings are in-band in the sense that, in the normal process of booting the computing system and configuring the configurable adapter (224), boot software such as system BIOS does retrieve the in-band configuration settings, and the in-band configuration settings are used directly by the boot software when configuring and initializing a configurable adapter (224).

In the example of FIG. 1, the in-band configuration settings for the configurable adapter (224) may be stored in an in-band configuration repository. The in-band configuration repository may be embodied as computer memory that includes configuration parameters for the configurable adapter (224) and is accessible by boot software such as system BIOS. The in-band configuration repository is in-band in the sense that, in the normal process of booting the computing system and configuring the configurable adapter (224), boot software such as system BIOS does access the in-band configuration repository to retrieve configuration parameters that are used when configuring and initializing a configurable adapter (224). The in-band configuration repository may be embodied, for example, as a Human Interface Infrastructure ('HII') database or other data source accessible during the boot process.

In the example of FIG. 1, the out-of-band configuration manager (202) can update in-band configuration settings for the configurable adapter (224) by writing the changes made to the out-of-band configuration settings to the in-band configuration repository. Consider an example in which the in-band configuration repository is embodied as an HII database. In such an example, updating in-band configuration settings for the configurable adapter (224) may be carried out by writing the changes made to the out-of-band configuration settings to the HII database, for example, by using a RouteConfig( ) function that enables data to be committed to the HII database.

The out-of-band configuration manager (202) can further perform out-of-band management of third party adapter configuration settings in the computing system (152) by retrieving, from the in-band configuration repository, metadata that includes updated in-band configuration settings for the configurable adapter (224). Retrieving metadata that includes updated in-band configuration settings for the configurable adapter (224) may be carried out by reading the updated in-band configuration settings from the in-band configuration repository and formatting the updated in-band configuration settings into a metadata format. Consider an example in which the in-band configuration repository is embodied as an HII database. In such an example, retrieving metadata that includes updated in-band configuration settings for the configurable adapter (224) may be carried out by reading the updated in-band configuration settings from the in-band configuration repository and formatting the updated in-band configuration settings into a metadata format, for example, by using an ExtractConfig( ) function that enables data to be read from the HII database and retrieved as an HII package in extensible markup language ('XML') format.

The out-of-band configuration manager (202) can further perform out-of-band management of third party adapter configuration settings in the computing system (152) by sending, to a configuration implementer, the metadata that includes updated in-band configuration settings for the configurable adapter (224). The configuration implementer is a module of computer program instructions that can configure various computing devices, including the configurable adapter (224), in the computing system (152). The configuration implementer may be executed during the boot process of the computing system (152) and prior to handing over control of the computing system (152) to the operating system. The configuration implementer may be embodied, for example, as a module of computer program instructions in BIOS, as a module of computer program instructions that is compliant with the Unified Extensible Firmware Interface ('UEFI') specification, and so on.

Also stored in RAM (168) is an operating system (154). Operating systems useful out-of-band management of third party adapter configuration settings in a computing system according to embodiments of the present invention include UNIX™, Linux™, Microsoft XP™, AIX™, IBM's i5/OS™, and others as will occur to those of skill in the art. The operating system (154) and the out-of-band configuration manager (202) in the example of FIG. 1 are shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers for out-of-band management of third party adapter configuration settings in a computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for out-of-band management of third party adapter configuration settings in a computing system according to embodiments of the present invention include modems for wired dial-up communications, Ethernet (IEEE 802.3) adapters for wired data communications network communications, and 802.11 adapters for wireless data communications network communications.

Figure 2:
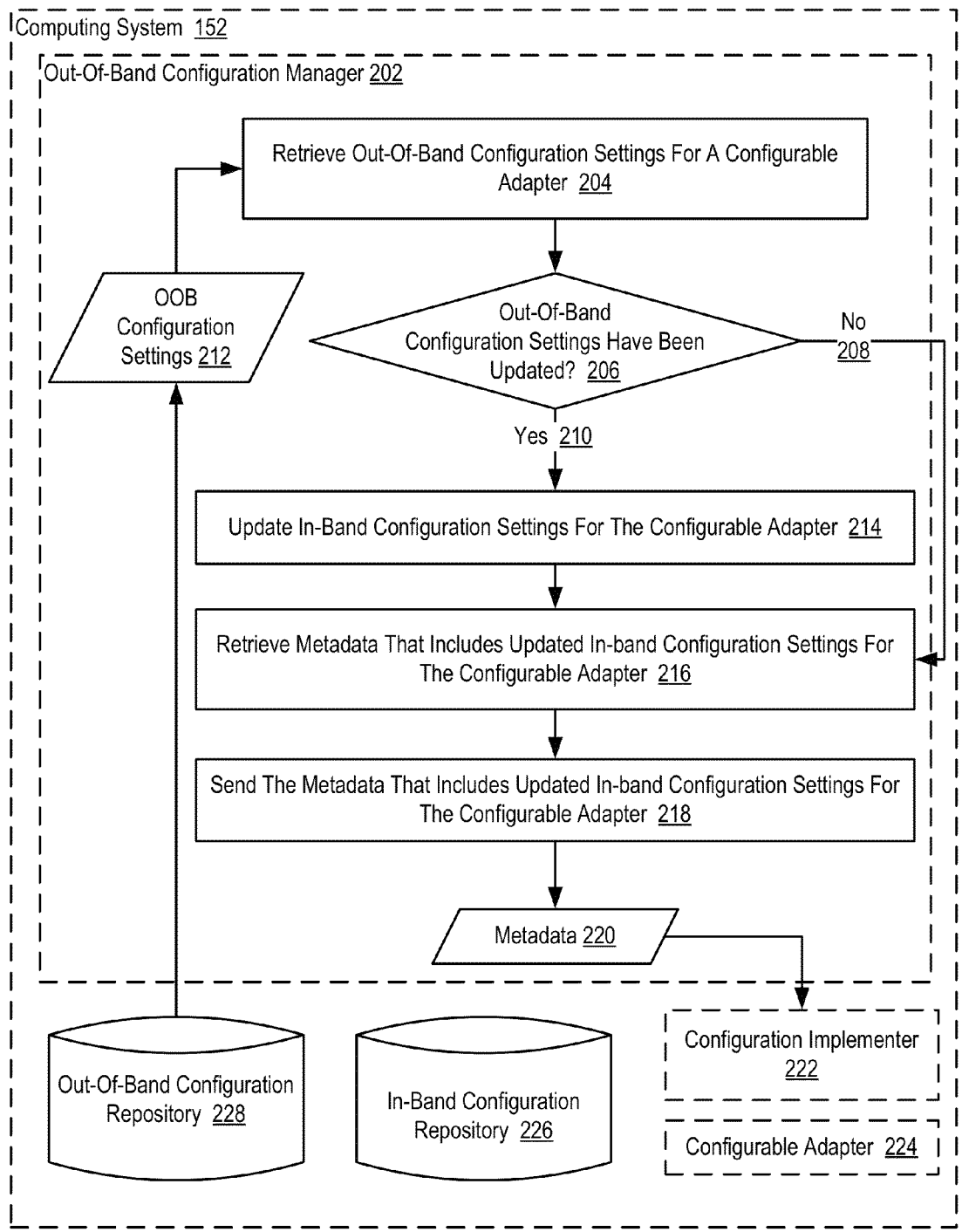
FIG. 2 sets forth a flow chart illustrating an exemplary method for out-of-band management of third party adapter configuration settings in a computing system according to embodiments of the present invention.

For further explanation, FIG. 2 sets forth a flow chart illustrating an exemplary method for out-of-band management of third party adapter configuration settings in a computing system according to embodiments of the present invention. The example method of FIG. 2 is carried out in a computing system (152) that includes one or more configurable adapters (224). In the example method of FIG. 2, a configurable adapter (224) is any adapter that enables the computing system (152) to interact with other computing systems over a predetermined communications protocol. Such configurable adapters (224) may operate as, for example, a FiberChannel adapter, Ethernet adapter, RAID controller, and so on. In the example method of FIG. 2, the configurable adapter (224) is configurable in the sense that operating aspects of the adapter, such as the data communications protocol implemented by the adapter, the adapter port that is utilized for data communications using a particular data communications protocol, and so on, can be altered based on the configuration settings that are loaded into the adapter.

The example method of FIG. 2 includes retrieving (204), by an out-of-band configuration manager (202) from an out-of-band configuration repository (228), out-of-band configuration settings (212) for a configurable adapter (224). In the example method of FIG. 2, an out-of-band configuration manager (202) may be embodied as a module of computer program instructions for out-of-band management of configuration parameters for the configurable adapter (224). The out-of-band configuration manager (202) is out-of-band in the sense that, in the normal process of booting the computing system and configuring the configurable adapter (224), the out-of-band configuration manager (202) takes no active role in actually configuring the configurable adapter (224). Computer program instructions such as system BIOS and the like are instead responsible for actively configuring the configurable adapter (224). As such, while the out-of-band configuration manager (202) can alter configuration settings that are subsequently retrieved and applied by boot software such as system BIOS, the out-of-band configuration manager (202) itself includes no computer program instructions that perform the action of initializing and configuring a configurable adapter (224).

In the example method of FIG. 2, the out-of-band configuration repository (228) may be embodied as computer memory that includes configuration parameters for the configurable adapter (224) and is accessible by the out-of-band configuration manager (202). The out-of-band configuration repository (228) is out-of-band in the sense that, in the normal process of booting the computing system and configuring the configurable adapter (224), boot software such as system BIOS does not access the out-of-band configuration repository (228) to retrieve configuration parameters that are used when configuring and initializing a configurable adapter (224). In the example method of FIG. 2, the out-of-band configuration repository (228) may be embodied, for example, as a database or other data source managed by a system management controller such as, for example, an IMM, BMC, and so on.

In the example method of FIG. 2, retrieving (204) out-of-band configuration settings (212) for a configurable adapter (224) may be carried out, for example, by searching the out-of-band configuration repository (228) for an entry that corresponds to an identifier for the configurable adapter (224). The out-of-band configuration settings (212) of FIG. 2 are settings that specify how the configurable adapter (224) is to operate such as, for example, settings that specify which data communications protocol the configurable adapter (224) should utilize for data communications with other computing systems, settings that specify which port data communications with other computing systems should be conducted over, and so on. In the example of FIG. 2, the out-of-band configuration settings (212) are out-of-band in the sense that, in the normal process of booting the computing system and configuring the configurable adapter (224), boot software such as system BIOS does not retrieve the out-of-band configuration settings (212), and the out-of-band configuration settings (212) are not used directly by the boot software when configuring and initializing a configurable adapter (224).

The example method of FIG. 2 also includes determining (206), by the out-of-band configuration manager (202), whether the out-of-band configuration settings (212) for the configurable adapter (224) have been updated. In the example method of FIG. 2, determining (206) whether the out-of-band configuration settings (212) for the configurable adapter (224) have been updated may be carried out by checking an update flag contained in the out-of-band configuration settings (212). Such an update flag may include a value that is used to indicate whether the out-of-band configuration settings (212) have been updated since the out-of-band configuration manager (202) last accessed the out-of-band configuration settings (212). Alternatively, determining (206) whether the out-of-band configuration settings (212) for the configurable adapter (224) have been updated may be carried out by comparing the out-of-band configuration settings (212) for the configurable adapter (224) to a previous version of the out-of-band configuration settings (212) for the configurable adapter (224). Comparing the out-of-band configuration settings (212) for the configurable adapter (224) to a previous version of the out-of-band configuration settings (212) for the configurable adapter (224) can be carried out, for example, on a value-by-value basis or by computing a hash value for each version of settings and comparing the resultant hash values.

The example method of FIG. 2 also includes, responsive to determining that the out-of-band configuration settings (212) for the configurable adapter (224) have (210) been updated, updating (214) in-band configuration settings for the configurable adapter (224). The in-band configuration settings of FIG. 2 are settings that specify how the configurable adapter (224) is to operate such as, for example, settings that specify which data communications protocol the configurable adapter (224) should utilize for data communications with other computing systems, settings that specify which port data communications with other computing systems should be conducted over, and so on. In the example of FIG. 2, the in-band configuration settings are in-band in the sense that, in the normal process of booting the computing system and configuring the configurable adapter (224), boot software such as system BIOS does retrieve the in-band configuration settings, and the in-band configuration settings are used directly by the boot software when configuring and initializing a configurable adapter (224).

In the example method of FIG. 2, the in-band configuration settings for the configurable adapter (224) are stored in an in-band configuration repository (226). The in-band configuration repository (226) may be embodied as computer memory that includes configuration parameters for the configurable adapter (224) and is accessible by boot software such as system BIOS. The in-band configuration repository (226) is in-band in the sense that, in the normal process of booting the computing system and configuring the configurable adapter (224), boot software such as system BIOS does access the in-band configuration repository (226) to retrieve configuration parameters that are used when configuring and initializing a configurable adapter (224). In the example method of FIG. 2, the in-band configuration repository (226) may be embodied, for example, as an HII database or other data source accessible during the boot process.

The example method of FIG. 2 also includes, responsive to determining that the out-of-band configuration settings (212) for the configurable adapter (224) have (210) been updated, updating (214) in-band configuration settings for the configurable adapter (224). In the example of method of FIG. 2, updating (214) in-band configuration settings for the configurable adapter (224) may be carried out by writing the changes made to the out-of-band configuration settings (212) to the in-band configuration repository (226). Consider an example in which the in-band configuration repository (226) is embodied as an HII database. In such an example, updating (214) in-band configuration settings for the configurable adapter (224) may be carried out by writing the changes made to the out-of-band configuration settings (212) to the HII database, for example, by using a RouteConfig( ) function that enables data to be committed to the HII database.

The example method of FIG. 2 also includes retrieving (216), by the out-of-band configuration manager (202) from the in-band configuration repository (226), metadata (220) that includes updated in-band configuration settings for the configurable adapter (224). In the example of method of FIG. 2, retrieving (216) metadata (220) that includes updated in-band configuration settings for the configurable adapter (224) may be carried out by reading the updated in-band configuration settings from the in-band configuration repository (226) and formatting the updated in-band configuration settings into a metadata format. Consider an example in which the in-band configuration repository (226) is embodied as an HII database. In such an example, retrieving (216) metadata (220) that includes updated in-band configuration settings for the configurable adapter (224) may be carried out by reading the updated in-band configuration settings from the in-band configuration repository (226) and formatting the updated in-band configuration settings into a metadata format, for example, by using an ExtractConfig( ) function that enables data to be read from the HII database and retrieved as an HII package in XML format.

The example method of FIG. 2 also includes sending (218), by the out-of-band configuration manager (202) to a configuration implementer (222), the metadata (220) that includes updated in-band configuration settings for the configurable adapter (224). In the example method of FIG. 2, a configuration implementer (222) is a module of computer program instructions that can configure various computing devices, including the configurable adapter (224), in the computing system (152). The configuration implementer (222) may be executed during the boot process of the computing system (152) and prior to handing over control of the computing system (152) to the operating system. The configuration implementer (222) may be embodied, for example, as a module of computer program instructions in BIOS, as a module of computer program instructions that is compliant with the UEFI specification, and so on.

Readers will appreciate that embodiments of the present invention enables configuration settings for configurable adapters to be managed out-of-band and without modifying the any of the processes that are currently used to configure adapters in a computing system. As such, augmenting exciting computing systems to support out-of-band management of configuration settings for configurable adapters can be implemented with minimal costs, as existing configuration processes need not be modified.

Figure 3:
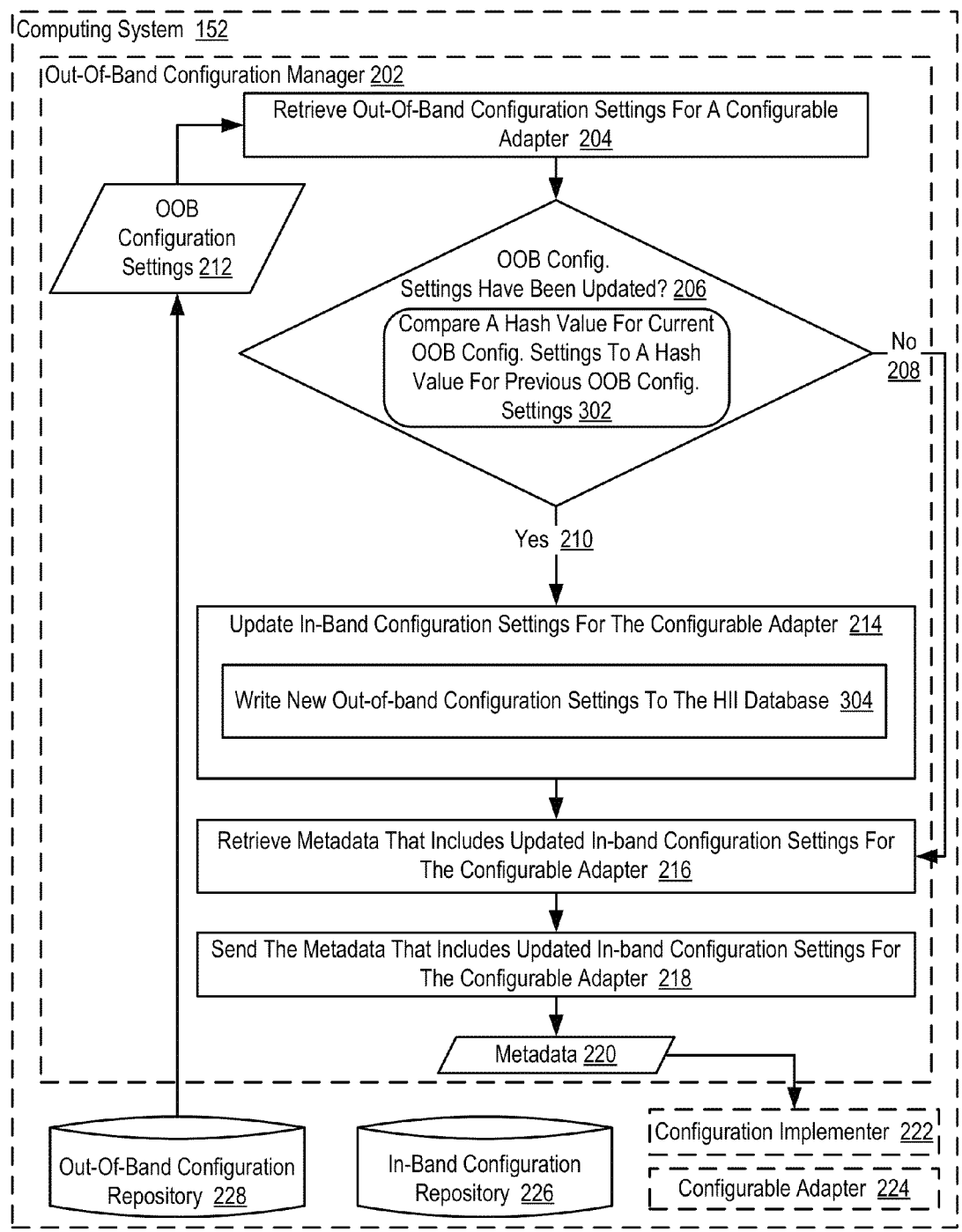
FIG. 3 sets forth a flow chart illustrating an exemplary method for out-of-band management of third party adapter configuration settings in a computing system according to embodiments of the present invention.

For further explanation, FIG. 3 sets forth a flow chart illustrating a further exemplary method for out-of-band management of third party adapter configuration settings in a computing system according to embodiments of the present invention. The example method of FIG. 3 is similar to the example method of FIG. 2, as it also includes retrieving (204) out-of-band configuration settings (212) for a configurable adapter (224), determining (206) whether the out-of-band configuration settings (212) for the configurable adapter (224) have been updated, updating (214) in-band configuration settings for the configurable adapter (224), retrieving (216) metadata (220) that includes updated in-band configuration settings for the configurable adapter (224), and sending (218) the metadata (220) that includes updated in-band configuration settings for the configurable adapter (224).

In the example method of FIG. 3, determining (206) whether the out-of-band configuration settings (212) for the configurable adapter (224) have been updated can comparing (302) a hash value for current out-of-band configuration settings (212) to a hash value for previous out-of-band configuration settings. In the example method of FIG. 3, the out-of-band configuration manager (202) may retain previous versions of the out-of-band configuration settings (212) in computer memory that is accessible by the out-of-band configuration manager (202). The out-of-band configuration manager (202) may retrieve the most recent previous version of the out-of-band configuration settings (212) using a date stamp or other indicator and compute a hash value for the most recent previous version of the out-of-band configuration settings (212). Alternatively, the out-of-band configuration manager (202) may simply retain the hash value for the most recent previous version of the out-of-band configuration settings (212).

The hash value for the most recent previous version of the out-of-band configuration settings (212) may be compared to the hash value for the current out-of-band configuration settings (212) to determine (206) whether the out-of-band configuration settings (212) have been updated. If the hash value of the most recent previous version of the out-of-band configuration settings (212) and the hash value of the current out-of-band configuration settings (212) are identical, the out-of-band configuration settings (212) have not been updated. If, however, the hash value of the most recent previous version of the out-of-band configuration settings (212) and the hash value of the current out-of-band configuration settings (212) are not identical, the out-of-band configuration settings (212) have been updated as evidenced by the fact that applying the same hash function to the most recent previous version of the out-of-band configuration settings (212) and to the hash value of the current out-of-band configuration settings (212) yields different hash values.

In the example method of FIG. 3, the in-band configuration repository (226) may be embodied as an HII database. As such, updating (214) in-band configuration settings for the configurable adapter (224) can include writing (304) updated out-of-band configuration settings (212) to the HII database. In the example method of FIG. 3, writing (304) updated out-of-band configuration settings (212) to the HII database may be carried out, for example, by using a RouteConfig( ) function that enables data to be committed to the HII database. The RouteConfig( ) may be utilized to extract out-of-band configuration settings (212) that are stored in XML format by the out-of-band configuration manager (202) and commit the extracted out-of-band configuration settings (212) to an HII database.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of out-of-band management of third party adapter configuration settings in a computing system, the computing system including one or more configurable adapters, the method comprising:

retrieving, by an out-of-band configuration manager from an out-of-band configuration repository, a data communications protocol for a configurable adapter, wherein the data communications protocol is utilized by the configurable adapter for data communications with other computing systems;

determining, by the out-of-band configuration manager, whether the data communications protocol for the configurable adapter has been updated in the out-of-band configuration repository; and responsive to determining that the data communications protocol for the configurable adapter has been updated in the out-of-band configuration repository:

updating, by the out-of-band configuration manager, in-band configuration settings for the configurable adapter, wherein the in-band configuration settings for the configurable adapter are stored in an in-band configuration repository; wherein updating in-band configuration settings for the configurable adapter further comprises writing from the out-of-band configuration repository, to a Human Interface Infrastructure (HII) database, the update of the data communications protocol while the configurable adapter is not being booted and while the configurable adapter is disconnected;

retrieving, by the out-of-band configuration manager from the in-band configuration repository, metadata that includes updated in-band configuration settings for the configurable adapter; and sending, by the out-of-band configuration manager to a configuration implementer, the metadata that includes updated in-band configuration settings for the configurable adapter, wherein the configuration implementer configures the configurable adapter.

2. The method of claim 1 wherein the out-of-band configuration repository is managed by a system management controller.

3. The method of claim 1 wherein determining whether the data communications protocol for the configurable adapter has been updated includes comparing a hash value for a current data communications protocol to a hash value for a previous data communications protocol.

\* \* \* \* \*